United States Patent
Ranta et al.

(10) Patent No.: US 6,782,255 B1
(45) Date of Patent: Aug. 24, 2004

(54) UPGRADING OF RESOURCES IN A TELECOMMUNICATIONS NETWORK

(75) Inventors: Pekka Ranta, Nummela (FI); Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/588,954

(22) Filed: Jun. 7, 2000

Related U.S. Application Data (63) Continuation of application No. PCT/FI98/00974, filed on Dec. 11, 1998.

(30) Foreign Application Priority Data

Dec. 16, 1997 (FI) .................................................. 974534

(51) Int. Cl.$^7$ ................................................. H04Q 7/20
(52) U.S. Cl. .................... 455/423; 455/424; 455/67.11; 455/67.13; 455/63.1; 455/562.1; 455/422.1; 370/206; 370/335; 370/330; 370/342; 370/347
(58) Field of Search ................................ 455/423, 422, 455/450, 454, 452, 447, 448, 562, 63.1, 11.1, 424, 67.11, 67.13; 370/350, 331, 330, 252, 337, 206, 210, 335, 342, 347

(56) References Cited

U.S. PATENT DOCUMENTS

| | | | | |
|---|---|---|---|---|
| 4,301,530 A | * | 11/1981 | Gutleber | .................... 370/342 |
| 5,103,459 A | * | 4/1992 | Gilhousen et al. | .......... 370/206 |
| 5,295,153 A | * | 3/1994 | Gudmundson | ............... 370/335 |
| 5,410,568 A | * | 4/1995 | Schilling | ..................... 370/342 |
| 5,420,850 A | * | 5/1995 | Umeda et al. | .............. 370/342 |
| 5,511,068 A | | 4/1996 | Sato | |
| 5,533,013 A | * | 7/1996 | Leppanen | .................... 370/342 |
| 5,577,265 A | | 11/1996 | Wheatley, III | |
| 6,069,884 A | * | 5/2000 | Hayashi et al. | ............. 370/335 |
| 6,167,038 A | * | 12/2000 | Hottinen et al. | ............ 370/335 |
| 6,314,304 B1 | * | 11/2001 | Uesugi | ........................ 455/562 |
| RE37,820 E | * | 8/2002 | Scheinert | ..................... 455/422 |

FOREIGN PATENT DOCUMENTS

| | | |
|---|---|---|
| GB | 2 287 620 | 9/1995 |
| GB | 2 309 616 | 7/1997 |

* cited by examiner

*Primary Examiner*—Marceau Milord
(74) *Attorney, Agent, or Firm*—Squire, Sanders & Dempsey L.L.P.

(57) ABSTRACT

The inventive idea is to send in the same cell on one channel several signals and to cause different radio frequency characteristics to the signals received on the same channel. The different characteristics of signals are brought about e.g. by modulating the signals in different ways or by sending the signals from different points, whereby the different signals will experience different radio channels. Owing to the different characteristics, the signals can be distinguished from one another by a joint detection, interference cancellation method. In the downlink direction from the base transceiver station to the mobile station and in the uplink direction from mobile station to the base transceiver station it is often advantageous to use different methods.

38 Claims, 7 Drawing Sheets

UPGRADING OF RESOURCES IN A TELECOMMUNICATIONS NETWORK

This application is a continuation of international application Ser. No. PCT/FI98/00974, filed Dec. 11, 1998.

FIELD OF THE INVENTION

This invention relates to upgrading of data transmission resources in a telecommunications network by placing several signals on the same channel.

BACKGROUND OF THE INVENTION

In telecommunications systems, the mobile stations and base transceiver stations may set up connections by way of the channels of a so-called radio interface. Demands on the data signalling rate, faultlessness and transfer delay are made on the connection depending on the type of information to be transferred.

A certain frequency range is always allocated for use by the mobile communications system. The frequency range is divided further into channels, whose data transfer resources are optimised according to the services provided by the telecommunications system. To have sufficient resources for use by the telecommunications system within the allocated limited frequency range, the channels in use must be used several times. For this reason, the coverage area of the system is divided into cells formed by the radio coverage areas of the individual base transceiver stations, and this is why the systems are often also called cellular radio systems.

Figure 1:
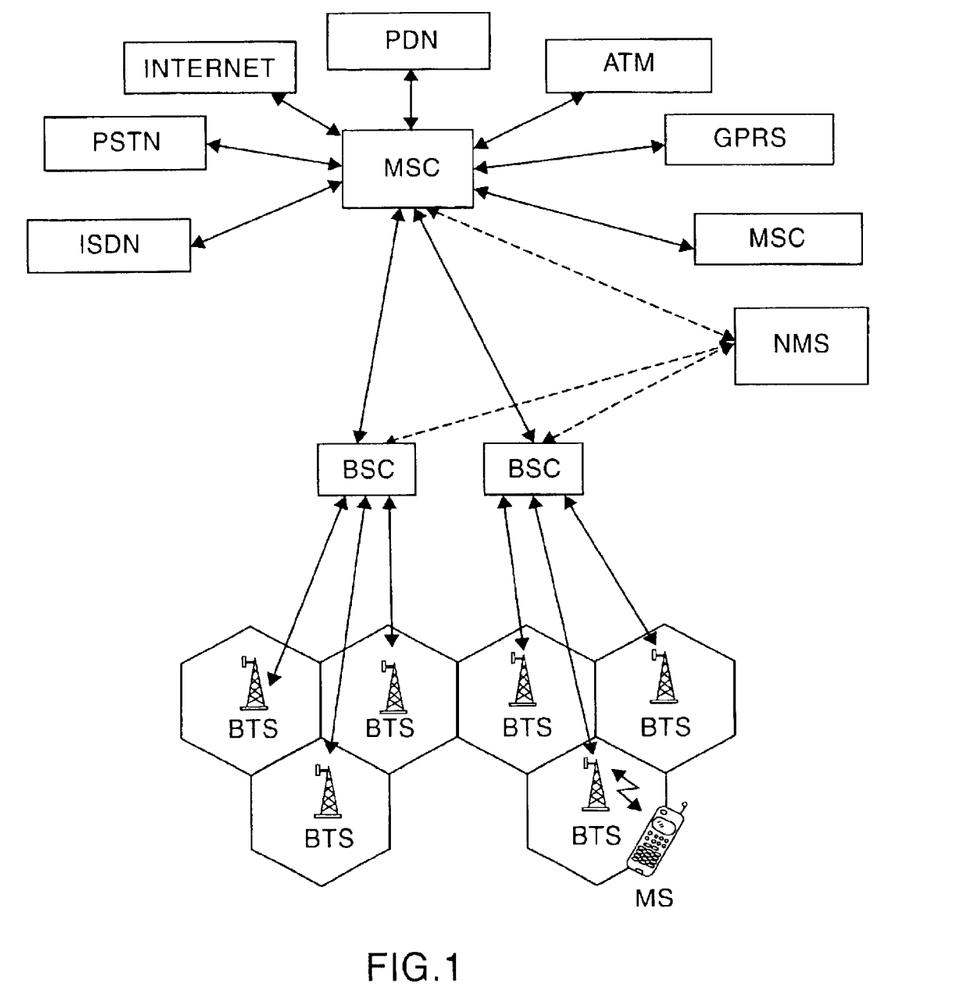
FIG. 1 shows an example of the structure of a telecommunications network.

Using the radio link, the mobile stations can use services provided by the telecommunications network. FIG. 1 shows the main structural features of a known telecommunications system. The network includes several interconnected MSCs (Mobile Services Switching Centres). The mobile services switching centre can set up connections with other mobile services switching centres or with other telecommunications networks, such as e.g. with ISDN (Integrated Services Digital Network), with PSTN (Public Switched Telephone Network), Internet, PDN (Packet Data Network), ATM (Asynchronous Transfer Mode) or with GPRS (General Packet Radio Service). Several base station controllers BSC are connected to the MSC. Base transceiver stations BTS are connected to each base station controller. The base transceiver stations may form connections with the mobile stations MS. A network management system NMS is used for collecting information from the network and for changing the programming of the network elements.

The air interface between base transceiver stations and mobile stations can be divided into channels in several different ways. Known methods are at least TDM (Time Division Multiplexing), FDM (Frequency Division Multiplexing) and CDM (Code Division Multiplexing). The band available in the TDM system is divided into successive time slots. A certain number of successive time slots form a periodically repeating time frame. The channel is determined by the time slot used in the time frame. In the FDM system the channel is determined by the frequency used, whereas in CDM systems the channel is determined by the used frequency hopping pattern or hash code. Combinations of the above-mentioned methods of division may also be used.

The information to be transferred is transported in a modulated form over the transmission channel. Known methods of modulation include amplitude modulation, where the information is contained in the signal amplitude, frequency modulation, where the information is contained in the signal frequency, and phase, modulation, where the information is contained in the signal phase. The transmission channel causes changes in the signal containing the information, so the signal perceived by the receiver is never an exact copy of the signal sent by the sender. In addition to amplitude attenuation, the sent signal will grow wider in the transmission channel, both on the frequency space and on the time space. Hereby the information contained in the signal by some modulation method will also change. The changes caused by the channel in the transmitted information can be corrected at the receiving end, if the channel characteristics are known with sufficient accuracy.

The maximum number of connections of the network servers and the data transmission resources of the connections indicate the resources of the telecommunications network. In a state-of-the-art system, one user signal can be conveyed on each channel. In addition, each channel has its own data transmission capacity. Under these circumstances, the system's capacity or resources within the area of a certain cell is directly limited by the number of channels available in the cell.

The number of mobile station subscribers is growing strongly. At the same time, applications requiring much bandwidth, such as multimedia applications, are becoming more usual. In this situation, it is not possible, with state-of-the-art arrangements to efficiently utilise the available frequency spectrum without huge and expensive extension works in the network.

It is an objective of this invention to alleviate the above-mentioned problem by upgrading the resources of the telecommunications network This objective is achieved with the method and equipment described in the independent claims.

BRIEF DESCRIPTION OF THE INVENTION

The inventive idea is in the same cell to send on the same channel several signals and with the receiver to cause different radio frequency characteristics for these. Thus a multiple quantity of information can be transferred on the same band. The different characteristics of signals are obtained e.g. by modulating the signals in different ways or by sending the signals from different points, whereby different signals will experience different radio channels. Based on the different characteristics, the signals can be distinguished from one another by joint detection or interference cancellation methods.

It is often advantageous to use different methods in the downlink direction from the base transceiver station to the mobile station and in the uplink direction from the mobile station to the base transceiver station.

According to one embodiment, different characteristics of different signals are brought about in the downlink direction by causing different phases for the signals to be transmitted. The mobile stations receiving the signals can hereby separate the signal addressed to themselves based on the different modulation of signals. It is not possible to synchronise that phase difference of signals sent in the uplink direction by mutually independent mobile stations which can be perceived by the base transceiver station's antenna. Since the channels experienced by the signals are different, they may nevertheless be separated from one another at the base transceiver station with the aid e.g. of estimates of channel characteristics obtained with the aid of orthogonal training periods of the signals. However, since the signals are not entirely orthogonal, a considerable improvement of the signal quality is achieved by joint detection methods. Two or more users may thus use the same channel, whereby the system is able to serve more users.

In a second embodiment of the invention, at least one party to the data transmission, e.g. the base transceiver station, has several transmission antennas at its disposal. Hereby different radio channels experienced by signals transmitted from different antennas may be utilised. The mobile station or stations can distinguish from each other signals received from the same channel e.g. with the aid of such different channel characteristics experienced by the signals which they estimate with the aid of the training periods of the signals. If several signals to be transmitted to one mobile station are transmitted from different antennas, the data transmission rate of this mobile station is increased. If signals to be transmitted to different mobile stations are transmitted from different antennas, the number of users can be increased. However, since the channel transmission functions are superimposed, at least in part, it is advantageous to use the joint detection method.

The signals sent by mobile stations located at different points in the uplink traffic direction will automatically experience different radio channels. In additions a base transceiver station equipped with several antennas may hereby utilise interference elimination based on the antennas.

LIST OF FIGURES

The invention will be described in greater detail referring to the appended drawings, wherein.

DETAILED DESCRIPTION OF THE INVENTION

The following is an examination of preferable embodiments of the invention with the aid of examples.

Figure 2:
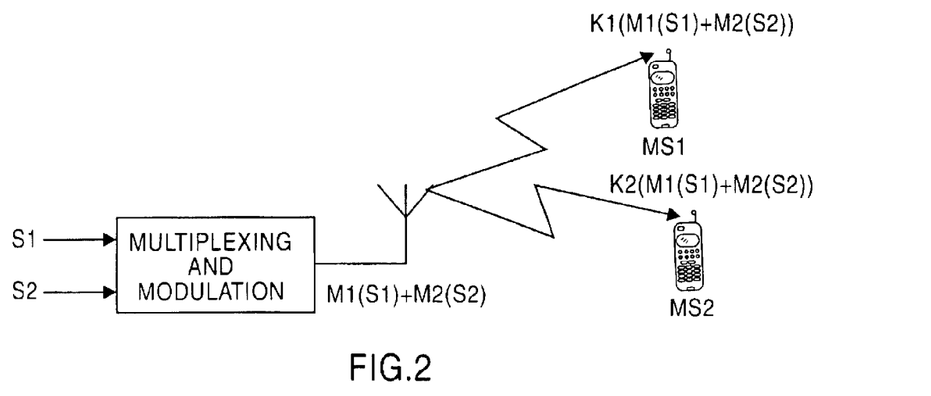
FIG. 2 shows an arrangement for transmitting two different signals on the same channel in the downlink direction.

According to the embodiment shown in FIG. 2, different characteristics of different signals are brought about in the downlink direction by modulating the signals in different ways, e.g. by causing different phases for the signals to be transmitted to different mobile stations. Signals S1 and S2 are supplied to a unit attending to multiplexing and modulation. The resulting modulated signal M1(S1)+M2(S2) to be transmitted to a radio path channel contains differently modulated signals. Signal S1 is modulated in the M1(S1) form and signal S2 in the M2(S2) form. Mobile stations MS1 and MS2 receive the signal converted by the radio channel in the K1(M1(SI)+M2(S2)) form and in the K2(M1(S1)+M2(S2)) form, wherein K1 and K2 are transmission functions of the radio channels experienced by the signals. The mobile stations interpret the signals S1 and S2 sent to themselves with the aid of the channel characteristics which they know and with the aid of a multiplexing and modulation method.

Figure 3:
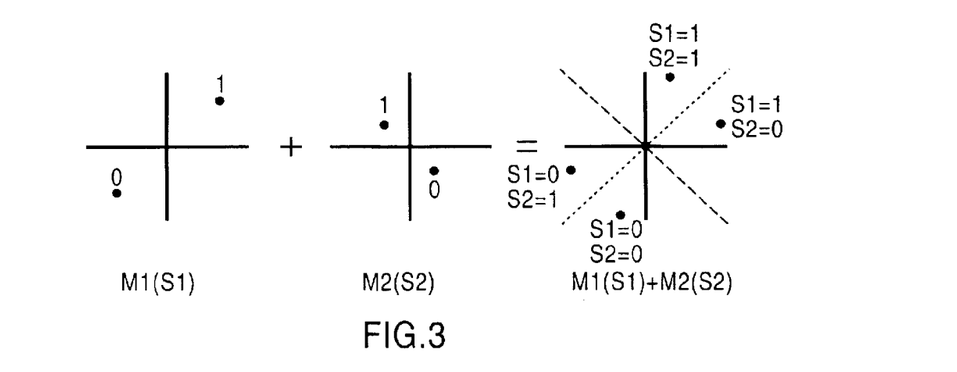
FIG. 3 shows the summing of two phase-modulated signals.

Multiplexing and modulation may be implemented in several different ways. A simple implementation is to cause a predetermined phase difference to the signals. FIG. 3 shows a sum signal which is to be sent to the radio path and which thus results from two binary phase-modulated signals. The signal sent to the mobile station MS1 is modulated in such a way that the signal's binary value of 1 is represented in a phase angle of +45 degrees. Correspondingly, a signal value of 0 is represented in a phase angle of −135 degrees. The signal to be sent to mobile station MS2 is modulated in such a way that the binary value 1 of the signal is represented in a phase angle of 135 degrees and the value 0 in a phase angle of −45 degrees. In the example shown in the figure, the amplitude of the signal component to be sent to mobile station MS2 is one-half of the amplitude of the signal component to be sent to mobile station MS1. Signals to be sent on the same channel are summed so that four possible signal points are formed in the phase pattern, and these are called constellation points. A constellation point located in a phase angle of 72 degrees represents a situation where both signal S1 and signal S2 are in state 1. In a phase angle of 18 degrees, signal S1 is of value 1 and signal S2 is of value 0. In a phase angle of 198 degrees, signal S1 is of value 0 and signal S2 is of value 1. In a phase angle of 252 degrees, both signals are of value 0.

Figure 4:
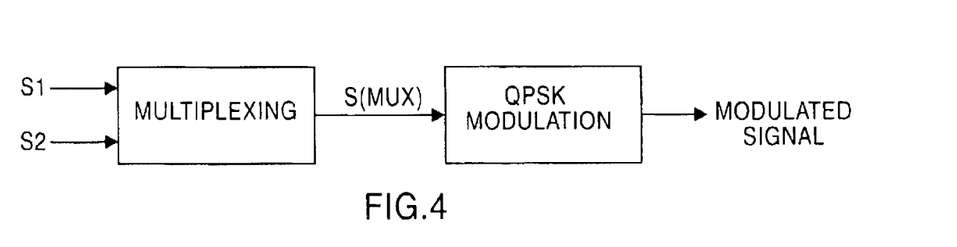
FIG. 4 shows multiplexing and modulation of two signals.

FIG. 4 shows another alternative for representing signals addressed to two mobile stations at different constellation points of a multi-level modulation method. The signals are first input to a multiplexer, which forms a multiplexed signal S(MUX), whose rate is the sum of the data rates of signals S1 and S2. S(MUX) is input to a multi-phase modulator, such as e.g. to a quadrate phase QPSK (Quadrate Phase Shift Keying) modulator. E.g. two normally binary modulated signals may be transmitted on the same channel by combining them into one two-dimensional-signal, which is modulated by quadrate phase modulation. In the modulated signal, a phase angle of 0 degree corresponds to a situation where Si=S2=1, a phase angle of 90 degrees corresponds to a situation where S1=1 and S2=0, a phase angle of 180 degrees to a situation where S1=S2=0 and a phase angle of 270 degrees to a situation where S1=0 and S2=1.

Figure 5A:
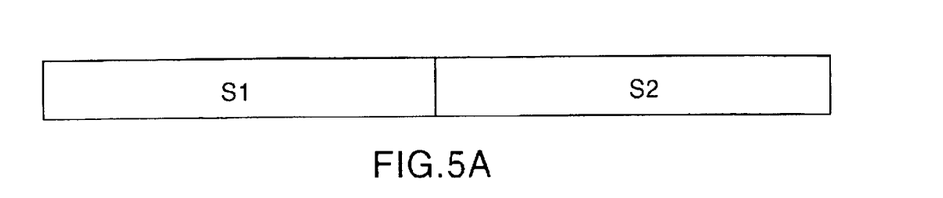
FIGS. 5A and 5B show two multiplexing methods.
Figure 5B:
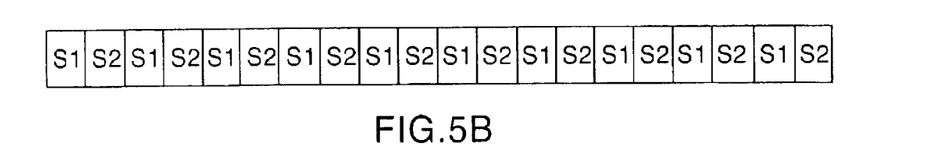

In addition to the multiplexing and modulation method presented above, multiplexing may take place in other ways, of which two examples are shown in FIGS. 5A and 5B In the example of FIG. 5A a burst is formed of signals S1 and S2, and in the early part of the burst the bits of signal S1 are transmitted while in the late part bits of signal S2 are transmitted modulated by a multi-level modulation method. However, the different signals may hereby experience quite different radio channel interference. The interference experienced by different signals may be levelled out by using a signal multiplexing method as shown in FIG. 5B, wherein the data bits of signals S1 and S2 to be transmitted in one burst are each divided into ten parts. The burst to be transmitted was put together by locating these parts after one another in such a way that of two successive parts one always belongs to signal S1 and the other to signal S2.

Figure 6:
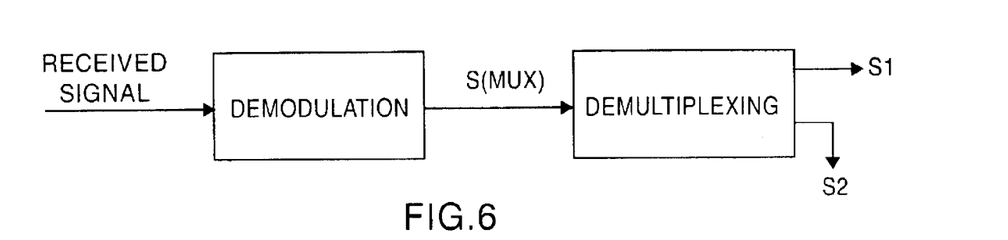
FIG. 6 shows the operation of a receiver.

FIG. 6 shows undoing of modulation and multiplexing performed by the mobile station receiving the signal. The receiver will undo the modulation, whereby the transmitted multiplexed signal S(MUX) is regenerated. The multiplexing is undone with a demultiplexer, whereby the original signals S1 and S2 are obtained. Of these the mobile station selects the signal addressed to itself, which is S1 in the example shown in the figure. Signal S2 is rejected.

Figure 7:
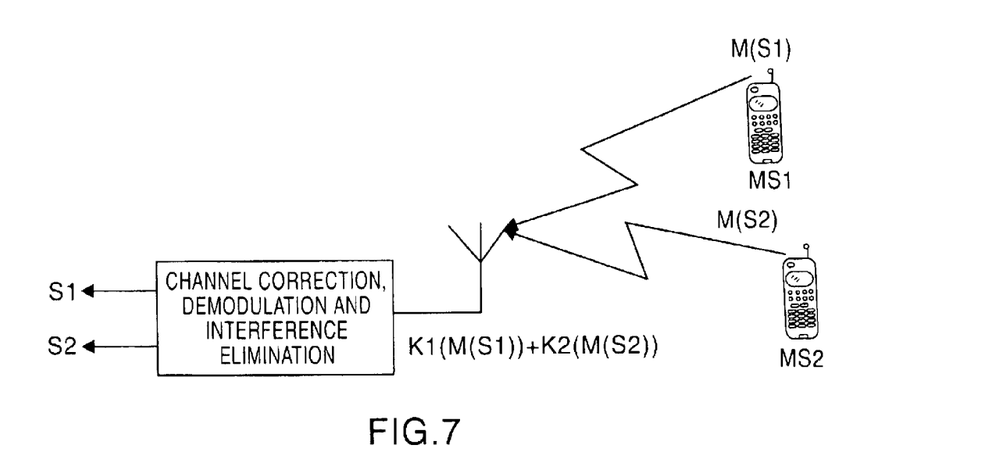
FIG. 7 shows an arrangement for transmitting two different signals on the same channel in the uplink direction.

A situation where two mobile stations use the same uplink channel is shown in FIG. 7. The mobile stations modulate in a normal manner the signal they send e.g. by a binary modulation method. Thus, mobile station MS1 sends a modulated signal M(S1) and mobile station MS2 sends a modulated signal M(S2). The signals have a random phase difference, since it is not possible to co-ordinate the reference phases of signals sent by mutually independent mobile stations. The radio channels experienced by signals sent by different mobile stations are different, whereby the base transceiver station detects a signal K1(M(S1))+K2(M(S2)) which is summed in the channel and wherein K1 is the transmission function of the radio channel between mobile station MS1 and the base transceiver station's antenna and K2 is the transmission function of the radio channel between mobile station MS2 and the base transceiver station's antenna. At the base transceiver station, demodulation, channel correction and interference elimination are performed on the signals.

Figure 8:
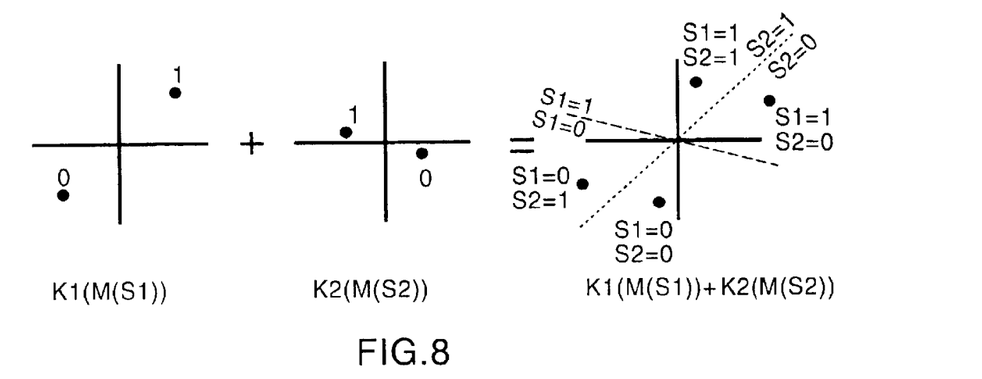
FIG. 8 shows formation of a sum signal received by a base transceiver station.

FIG. 8 shows a simplified example of the formation of a sum signal received by the base transceiver station's antenna. At the base transceiver station's antenna the, amplitude of the signal sent by mobile station MS1 is two times the amplitude of the signal sent by mobile station MS2. The value 1 of signal S1 sent by mobile station MS1 is represented at the base transceiver station's antenna as a phase of +45 degrees and the value 0 as a phase of −135 degrees. Correspondingly, the value 1 of the signal S2 sent by mobile station MS2 is represented at the base transceiver station's antenna as a phase of 164 degrees and the value 0 as a phase of −16 degrees. The constellation point which in the sum signal is at a phase angle of 75 degrees shows a situation where both signal S1 and signal S2 are in state 1. In a phase angle of 25 degrees, the value of signal S1 is 1 and the value of signal S2 is 0. In a phase angle of −155 degrees, the value of signal S1 is 0 and the value of signal S2 is 1. In a phase angle of −105 degrees, the value of both signals is 0. In addition, at points S1=1;S2=0 and S1=0;S2=1 the amplitude of the sum signal is one-and-a-half times the amplitudes of the other constellation points.

To facilitate the detection of signals to be received, it is advantageous to adjust the amplitudes-of the different signals to be approximately equal, e.g. with a precision of 10 decibels. This will affect the transmission power adjustment both in the uplink and in the downlink direction. Especially in the uplink direction it is advantageous to locate on the same channel such connections only which experience a radio path distance attenuation of equal magnitude. Hereby the amplitudes can be adjusted to equal values with adequate precision with the aid of the limited dynamics range of power regulation algorithms. If the dynamics range of power regulation is of a sufficient size, it is not necessary to take into account the radio path attenuation experienced by the connections when placing connections on the channels.

To be able to distinguish signals from one another, the base transceiver station must have a sufficient knowledge of the changes caused by different channels to different signals, that is, it must know the channel transmission function. As used herein, the channel transmission function mainly means the channel's impulse response and the signal's possible spatial characteristics, that is, its direction of incidence. In systems including several receiving antennas, the direction of incidence can be estimated by comparing with each other the signals received by the different antennas.

Figure 9:
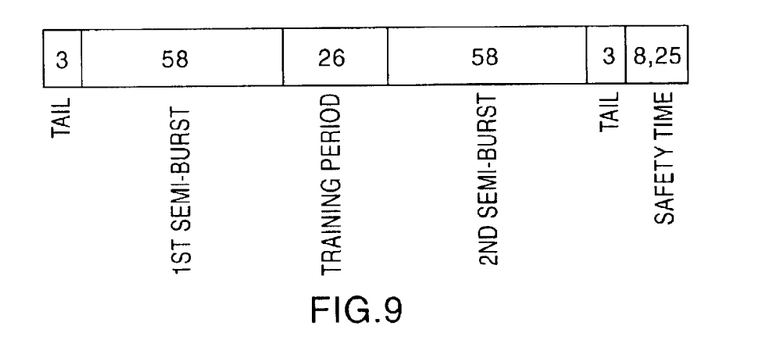
FIG. 9 shows a burst.

The channel's transmission function may be estimated in advance with the aid of known training periods. FIG. 9 shows how an training period is placed in a burst used in digital radio communication. In the figure, the training period is placed in the middle part of the burst, whereby in the average distance of formation bits from the training period can be minimised. In front of the training period a first semi-burst is placed which contains information to be transmitted, while another semi-burst containing information is placed after the training period. Besides, at the burst ends there are tails needed for detecting the burst ends and a safety time which is used to prevent overlapping of successive bursts. By using in bursts sent by different mobile stations such training periods which are as orthogonal as possible when compared with one another, it is possible with sufficient accuracy to estimate the transmission functions of channels between different mobile stations and the base transceiver station's antenna.

To make it possible to distinguish from each other signals sent on the same channel, the training periods to be located in the signals must be sufficiently orthogonal with each other. To ensure this, the network must allocate for the connections such training periods which are sufficiently orthogonal with each other. This requires a small change e.g. in the present GSM system, where one training period only is presently used in one cell.

In order to estimate channel characteristics, it is possible also to use other estimation methods, such as blind channel estimation, in addition to or instead of methods based on the use of an training period. In blind channel estimation, an estimate of channel characteristics is maintained by defining from the received signal the statistically most probable transmitted signal. If a signal reconstructed from the received signal with the aid of estimated channel characteristics is not probable or even possible, then the estimate of channel characteristics will be changed. When beginning an estimation, in order to bring about a reliable channel estimate the received signal must either be studied for a rather long time or such a short period must be included in the transmitted signal, whose contents are known by the recipient. Due to changes in the channel characteristics, the estimate must be updated constantly, which requires rather much computing power. In fact, blind channel estimation is at its best in systems utilising continuous transmission, and it is not so suitable for estimation of channels in telecommunications systems using time division as are the methods used in the examples of this application which are based on the use of an training period.

In the example shown in FIG. 8 only a random phase difference is shown which is formed between different signal components. In addition to this, difference between channels is caused by the different multipath propagation experienced by the different signal components. Multipath propagation means that between the transmission and reception points the signal does not travel only the straightest possible route, but the receiver also detects components which have been reflected from various obstacles and which have been delayed in various ways. These different delays cause not only signal fading but also confusion between information transmitted in succession. In analogue systems this is perceived as reverberation of the signal. In digital systems, where information is transmitted as successive symbols, the symbol $S_k$ conveyed by the signal propagating the shorter route and the preceding symbol $S_{k-1}$ conveyed by the signal propagating along the longer route are superimposed in the received signal. This phenomenon, which is called ISI (InterSymbol Interference) makes it more difficult to interpret the transmitted signal correctly at the receiving end. E.g. in a known GSM system, the duration of one bit is 3.7 microseconds, during which time light travels approximately 1100 m. Hereby even a difference of a few hundred meters between the lengths of signal travel routes is enough to cause a significant superimposition of two bits in the received signal.

Figure 10:
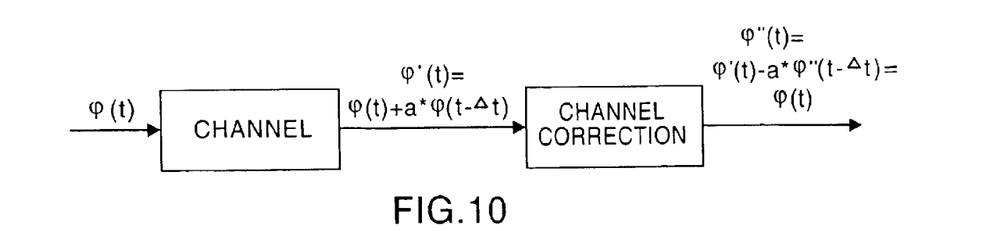
FIG. 10 shows the principle of channel correction.

The effect of an ISI interference between signals can be corrected with channel correctors, the idea of which is to study the changes caused by the channel to the signal and with their aid to reconstruct the original signal from the received signal. FIG. 10 shows the use of channel correctors. On the channel a signal φ(t) is sent, which is changed by the channel into a signal φ'(t) to be received. Information has been obtained for the channel corrector on what kind of changes the channel has caused in the signal, and the corrector reconstructs the transmitted information based on the signal which it received and based on the channel characteristics which it knows. Since the signals transmitted from different points to the base transceiver station's antenna have experienced a different radio channel, the channel corrector will amplify the desired signal.

However, since signals summed on the same channel are not perfectly orthogonal, a significant improvement in the signal quality is achieved by joint detection methods. Various joint detection methods improving the detection of one subscriber's or several individual subscribers' signal by utilising the signal parameters of other subscribers are known especially from the CDMA (Code Division Multiple Access) systems. Combining signals arriving from surrounding cells in a joint detection process may in some cases further improve the advantage obtained with the method. Interference elimination is usually performed by reducing interfering signals in such a way from the signal received at the base transceiver station that other signals are subtracted from the received signal as a series or parallel processing, whereby the noise level is reduced seen from the viewpoint of the undetected signal. The interference elimination may be performed either on a broadband or a narrow-band signal. Interference elimination is usually used to reduce interference within the same cell. Interference elimination may be used also in other systems than in CDMA systems. For example, a method of interference elimination designed for the TDMA (Time Division Multiple Access) system is presented in the publication P. Ranta et. al.: Co-channel interference cancelling receiver for TDMA Mobile Systems, ICC'97.

Figure 11:
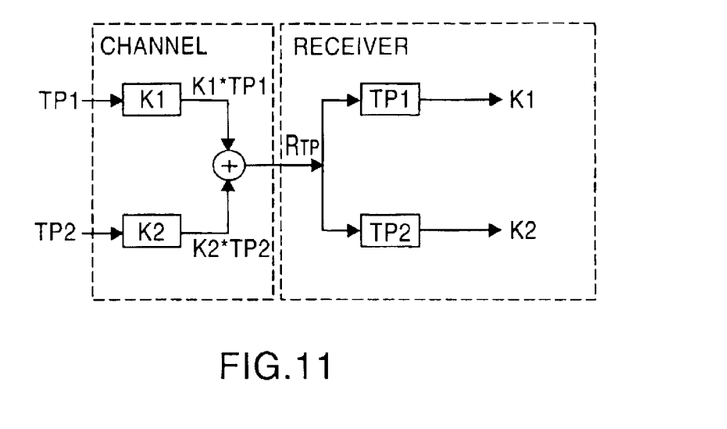
FIG. 11 shows the definition of channel transmission functions.

In the following an example is studied wherein two signals are interpreted from an antenna signal received by a base transceiver station using joint detection. The transmission function of the channels experienced by signals S1 and S2 are marked with the symbols K1 and K2. The base transceiver station's antenna perceives the sum signal R of the transmitted signals which have passed through the channel, $$R \approx K1*S1+K2*S2,$$

Wherein * means a convoluting operation. FIG. 11 shows the principle on which transmission functions K1 and K2 of the channel are defined. To determine the characteristics of the channels experienced by the different signals, training periods TP1 and TP2 are located in the bursts, for which training periods it is true that $$TP1*TP1=\delta \text{ and}$$

$$TP1*TP2=0.$$

The signal perceived by the recipient during the training period is $$R_{TP} \approx K1*TP1+K2*TP2.$$

From this the channel's transmission functions K1 and K2 are solved with the aid of known training periods, $$R_{Tp}*TP1 \approx K1*TP1*TP1+K2*TP2*TP1=K1, \text{ and}$$

$$R_{TP}*TP2 \approx K1*TP1*TP2+K2*TP2*TP2=K2.$$

With the aid of the transmission functions the operators D1 and D2 to be de-convoluted are also defined, for which it is true that $$D1*K1*S1 \approx S1, \text{ and}$$

$$D2*K2*S2 \approx S2.$$

Figure 12:
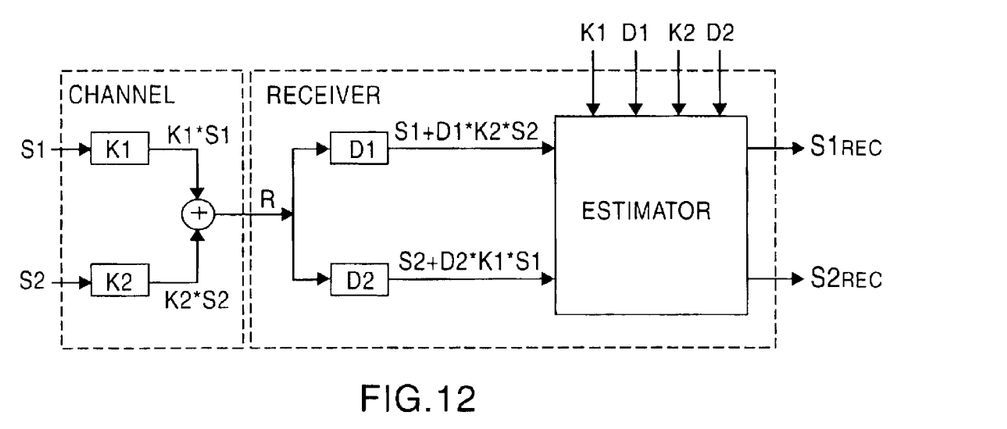
FIG. 12 shows interpretation of two signals from a received sum signal.

FIG. 12 shows an interpretation of two signals from a received sum signal. In the parts of the burst containing user data not known to the recipient beforehand the signal to be received is $$R \approx K1*S1+K2*S2,$$

From which by channel correctors D1 and D2 the first estimates S1' and S2' are obtained for the signals to be received, $$S1'=D1*R(D1*K1*S1+D1*K2*S2(S1+D1*K2*S2, \text{ and}$$

$$S2'=D2*R(D2*K1*S1+D2*K2*S2(D2*K1*S1+S2.$$

If the channels experienced by the different signals are orthogonal with each other, then D1*K2=D2*K1=0, and the signals S1 and S2 can be regenerated directly. However, this is not generally the case, but signals S1 and S2 sent on the same channel cause mutual interference in each other's reception. However, in the branch shown topmost in the figure, signal component S1 has been strengthened in relation to component S2. Correspondingly, in the lower branch, signal component S2 has been strengthened in relation to component S1. The upper and lower branches are input to an estimator, which subtracts the interference caused to each other by the signals of the different branches. The received signals S1REC and S2REC are the final result obtained.

In practical implementations, the signals are usually input directly to a multi-dimensional signal estimator. In the example shown in FIG. 12, the signals have by way of example been de-convoluted before being input to the signal estimator in order to describe the operation of the receiver.

In order to implement the embodiment described above, the base transceiver station must be adapted to transmit several different signals in the downlink direction, which signals have been multiplexed and modulated in a predetermined manner. In the uplink direction the base transceiver station or some network element connected to it must be able to estimate the characteristics of channels of signals transmitted from different points and with their aid to interpret several signals received by the base transceiver station on the same channel. In addition, it is preferable to adapt the base transceiver station to use elimination of interference between the signals in the interpretation of signals.

Correspondingly, the mobile station must be able to receive the signal sent by the base transceiver station, to interpret several signals multiplexed to one channel, and from the interpreted signals to select the parts addressed to itself.

Figure 13:
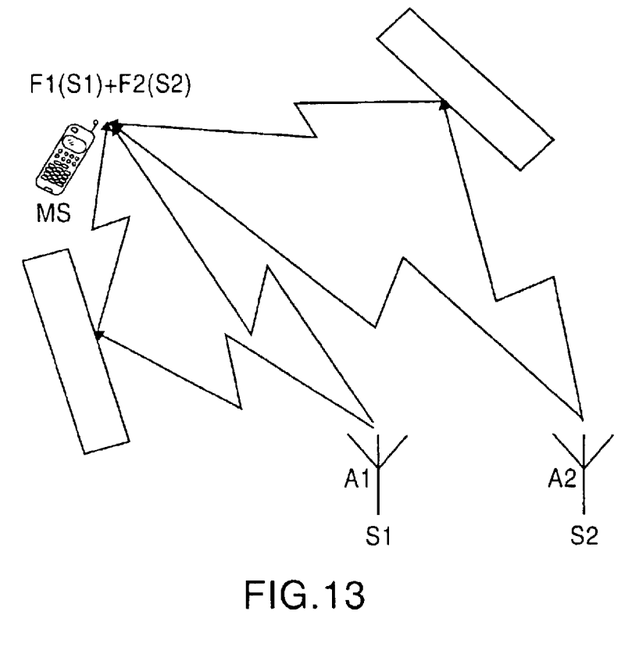
FIG. 13 shows a transmission taking place with two antennas.

An implementation according to another embodiment of the invention is shown in FIG. 13. In this embodiment, several antennas are available to the transmitter. The antennas are separate from one another, and the distance between them may be e.g. a few radio path signal wave lengths, which e.g. in the GSM 1800 system is 17 cm. Of course, the distance between antennas may be longer, e.g. hundreds of metres or some kilometres.

In the example shown in the figure, the base transceiver station has two antennas, antennas A1 and A2. The base transceiver station is adapted to divide the information it sends into two signals S1 and S2. Signal S1 is sent by way of antenna A1 and signal S2 by way of antenna A2. Because the antennas are physically separated, the radio channel between the different antennas and mobile station MS is different. The mobile station estimates the characteristics of radio channels e.g. with the aid of training periods located in the signals. The training periods must be as orthogonal as possible so that they can be distinguished from one another. This must be taken into account when allocating the training period to be used in the connection. Having estimated the transmission functions of the channels, the mobile station is able to distinguish from each other signals sent through different antennas with the above-mentioned method based on a knowledge of the transmission functions of the different channels and on an elimination of interference between the signals.

According to the invention, the increased data transmission rate may be utilised in several different ways. E.g. the signals S1 and S2 to be transmitted may both be addressed to the same recipient, such as a mobile station. As another possibility, several mobile stations may interpret the signals S1 and S2 and select from these the part addressed to themselves. Of course, one must hereby agree in advance, e.g. with the aid of signalling procedures, how the information to be addressed to different mobile stations is located in the signals.

Figure 14:
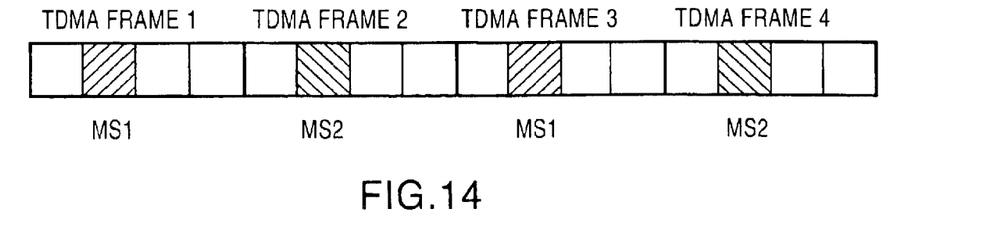
FIG. 14 shows four successive time frames according to time division multiple access TDMA.

A third possibility of using an increased data signalling rate is shown in FIG. 14, which shows four successive TDMA (Time Division Multiple Access) time frames. In each TDMA frame there are four time slots. Time slot 2 is allocated for use by mobile stations MS1 and MSD2. In time slot 2 of odd TDMA frames information addressed to mobile station MS1 is sent at a double rate in accordance with the invention. In time slot 2 of even TDMA frames information addressed to mobile station MS2 is sent, likewise at a double rate in accordance with the invention. In this way one channel is able to serve a double number of subscribers, whereby the service ability of the telecommunications network is doubled.

If the mobile station is equipped with several antennas, the multi-antenna transmission presented above may also be used in the uplink direction. Hereby the data transmission resources- of the individual mobile station can be multiplied also in the uplink direction. Alternatively, also this embodiment may use the already described transmission taking place in the same cell and on the same channel of several different mobile stations.

A receiver equipped with several antennas may perform interference elimination based on the use of so-called adaptive antennas. This may be utilised e.g. in situations where the mobile station has only one antenna, but the base transceiver station has several antennas.

It is known at the base transceiver station to use adaptive antennas, that is, antennas having an adaptively adjustable directional pattern, with which the reception at the base transceiver station is directed at a narrow geographical area. Signals arriving from outside the main beam of the adaptive directional antenna are attenuated at a ratio determined by the directional pattern of the antenna compared with signals received from the main beam. When using adaptive antennas, the chosen mobile station may send its signal at a transmission power which is lower than the normal power thanks to the better antenna amplification and signal processing of the reception. Hereby the use of adaptive antennas mainly reduces the interference caused to the adjacent cell and increases the base transceiver station's coverage in the direction of the antenna's main beam. Directional antennas may be adaptive, with a direction that can be changed, or they may be fixedly directed. The signal 'sent by an individual mobile station may be received through several antenna beams, whereby it is possible to combine e.g. signal components caused by multi-path propagation or else to process the mobile station's signal received by different antennas e.g. by weighting the received signals in different ways so that the signal will be amplified in comparison with the other received signals. Thus, it is possible to change the directional pattern of the adaptive antenna by receiving the signal through several fixedly directed antenna beams and by weighting in a suitably manner the signals thus received. The use of adaptive antennas achieves a reduced interference level thanks to the narrow antenna beam, when the interference from other subscribers is reduced and the interference caused to other subscribers is reduced.

Figure 15:
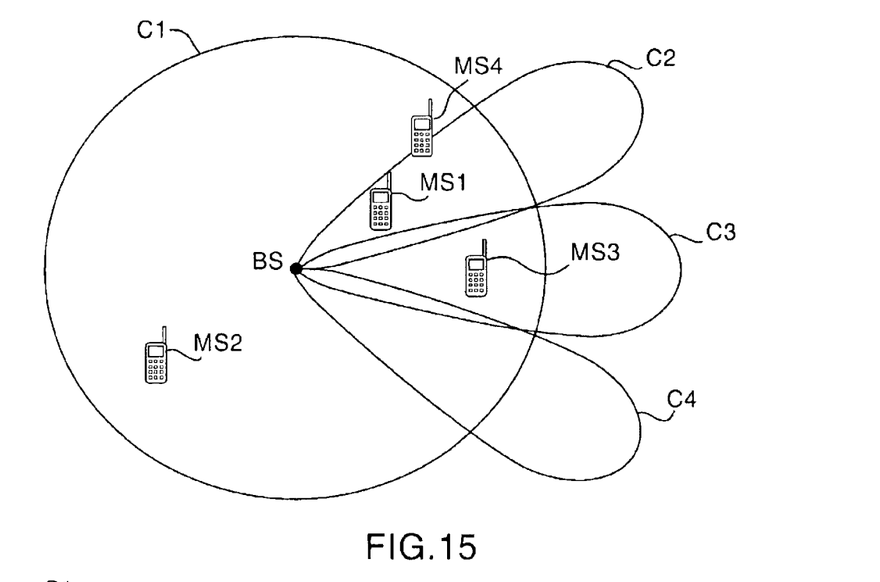
FIG. 15 shows the use of adaptive antennas.

The use of adaptive antennas is illustrated in FIG. 15, where a cell coverage C1 is arranged for base transceiver station BS by an omni-directional antenna provided with a fixed directional pattern while cell coverages C2–C4 are arranged by directed antennas. In the case shown in FIG. 15 the signal reception of mobile station MS1 is arranged at base transceiver station BS by the antenna of cell C2 while the signal reception of mobile station MS3 is arranged by the antenna of cell C3. The signal of mobile station MS1 may be received also e.g. through the antenna of cell C3 and, correspondingly, the signal of mobile station MS3 by the antenna of cell C2 and/or cell C4. The signals of mobile station MS1 received through different antennas are combined in order to facilitate detection of the signal. Likewise, all signals received from mobile station MS3 are combined. The signals of the other mobile stations MS2 and MS4 shown in the figure are received by the omnidirectional antenna of cell C1. It is a drawback of the use of adaptive antennas that the reception directed to all subscribers requires much processing in the network.

Figure 16:
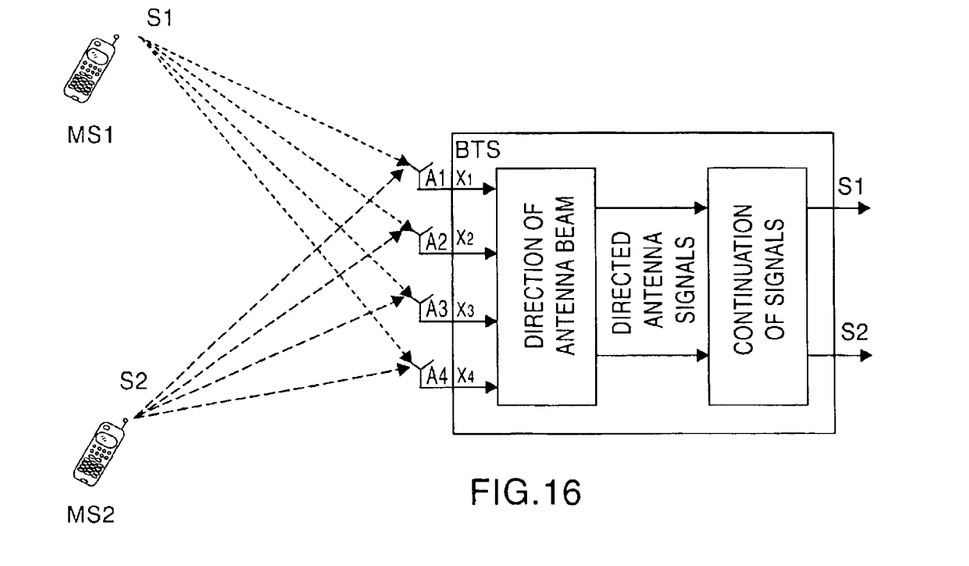
FIG. 16 shows the fundamental principle of the use of adaptive antennas.

FIG. 16 shows the basic principle of using adaptive antennas 16. The base transceiver station perceives signals S1 and S2 sent by two mobile stations MS1 and MS2 with several different antenna elements A1 . . . A4. Although the signal x1 . . . x4 received by each individual antenna element is in fact a combination of two separate transmitted signals S1 and S2, the different antennas perceive the different combinations. The signal components can be distinguished from one another during the different training periods of signals S1 and S2 which are known to the receiver. Hereby the receiver may conclude how signals S1 and S2 are summed in the signals received by the different antennas, and based on this it determines the directions of incidence of the signals. With the aid of this information, antenna beams directed in the direction of incidence of the signals may be formed from the antenna signals. The direction of the antenna beam essentially strengthens the desired signal arriving from the direction of the beam.

If both the mobile station and the base transceiver station uses several antennas, it is possible in each transmission direction to use both transmission of different signals through different antennas in accordance with the invention and interference elimination based on the antennas. If the same frequency is used in each transmission direction, whereby the system is called TDD (Time Division Duplex), the radio channels are similar in the different directions of transmission. Hereby that party to the data transmission which uses several antennas, that is, the mobile station or the base transceiver station, may use the direction of incidence of the desired signal which it concluded with the aid of the received training period as an aid in directing the beams of its transmission antennas. This embodiment is especially advantageous for directing signals sent by the base transceiver station in the downlink direction. Hereby the base transceiver station estimates from the received sum signal the directions of incidence of the desired signals as well as the, characteristics of the radio channels experienced by the signals. Based on this information it directs the signals to be sent to mobile stations in the downlink direction towards the mobile stations receiving the signals, whereby any interference caused to other connections will be reduced. Further, the signals to be sent to a mobile station are sent by dividing the total signal into partial signals, for each one of which a different training period is used, and by sending the different partial signals through different antennas. If a base transceiver station uses e.g. eight antennas, and signals S1 and S2 are sent to the same mobile station, the signal S1 is sent through antennas 1–4 while signal S2 is sent through antennas 5–8. The signals sent by antenna groups are directed on the basis of the signal's direction of incidence estimated on the basis of the signal received in the uplink direction.

With the method according to the invention the data transmission resources of the individual cell may be primarily increased. This is of direct benefit to the serving of traffic hot spots occurring in a cell. Since the total transmission power of signals to be sent on a channel in an implementation of methods according to the invention is higher than the transmission power for use in the individual connection, the level of interference caused to other cells will rise. However, by combining the methods according to the invention with channel allocation coordinated between cells an increase of resources is achieved for the whole telecommunications network.

It should be noted that although in the examples presented in the foregoing the modulation method used was a binary modulation method, the invention is not limited to this. The invention may also be used in systems using other modulation methods, such as QPSK (Quadrate Phase Shift Keying) including four constellation points or 16-QAM (QAM=Quadrate Amplitude Modulation) including 16 constellation points.

To keep the presentation simple, only two signals to be transmitted on the same channel are shown in the presented examples. It should be noted, however, that the invention is not limited to this, but the method according to the invention may be used also with higher numbers of signals. Hereby either more constellation points or more antennas are used in the modulation. With methods according to the invention the data transmission resources may also be upgraded to varying degrees in different directions. The advantage thus achieved may be optimised by adjusting the asymmetry of the frequency band allocated for use by the different directions of transmission. Locating several signals on the same channel will not cause any essential changes to the structure of receivers, although the increasing of the number of signals naturally makes greater demands on the signal processing ability of the receiver.

What is claimed is:

1. A method of upgrading data transmission resources in a telecommunications network comprising at least mobile stations, base transceiver stations and their antenna units, and wherein the data transmission resources are divided into multiplexing channels, by the use of which connections may be set up between the mobile stations and the base transceiver station, the method comprising;

sending by at least two transmitter antennas on a same multiplexing channel a first signal by a first transmitter antenna and a second signal different from the first signal by a second transmitter antenna, thereby the first signal and the second signal experiencing different radio channels;

receiving the first and second signals via said different radio channels as a sum signal on the multiplexing channel;

estimating channel characteristics of the radio channels experienced by the received first and second signals; and detecting the first and second signals from the sum signal by using the estimated channel characteristics.

2. The method as defined in claim 1, wherein the first and second transmitter antennas are at a same base transceiver station.

3. The method as defined in claim 1, wherein the first and second transmitter antennas are in a same mobile station.

4. The method as defined in claim 1, wherein the first and second transmitter antennas are respective transmitter antennas of two mobile stations.

5. The method as defined in claim 4, wherein transmission powers of the two mobile stations are controlled so that an antenna of the base transceiver station will perceive the signals sent by the two mobile statons as being equally strong with the desired precision.

6. The method as defined in claim 1, wherein the first and second signals are received by two mobile stations.

7. The method as defined in claim 1, wherein the first and second signals are received by one mobile station.

8. The method as defined in claim 1, wherein the channel characteristics of radio channels experienced by the received signals are estimated with aid of training periods located in the signals.

9. The method as defined in claim 8, wherein the training periods located in the received signals are essentially orthogonal with each other.

10. The method as defied in claim 9, wherein the telecommunications network allocates the training periods for use with the first and second signals.

11. The method as defined in claim 1, wherein the channel characteristics of radio channels experienced by the received signals are estimated by blind channel estimation.

12. The method as defined in claim 1, wherein detecting of the first and second signals further includes eliminating interference between the fit and the second signals.

13. The method as defined in claim 12, wherein eliminating interference is performed using adaptive antennas.

14. The method as defined in claim 12, wherein eliminating interference is performed using co-channel interference cancellation.

15. The method as defined in claim 12, wherein eliminating interference is performed using joint detection.

16. The method as defined in claim 1, wherein the same multiplexing channel is a time division multiplex channel.

17. The method as defined in claim 1, wherein the same multiplexing channel is a code channel of code division multiple access.

18. The method as defined in claim 1, wherein in an uplink direction to a base transceiver station, at least two mobile stations, independently of one another, send the first and second signals on the same multiplexing channel, and wherein in a downlink direction from the base transceiver, the base transceiver sends at least two different signals addressed to at least two mobile stations, the at least two different signals being multiplexed and modulated onto the same multiplexing channel, and wherein mobile stations interpret a downlink signal addressed to themselves with aid of modulation and multiplexing methods known to themselves.

19. The method as defined in claim 18, wherein when interpreting the downlink signal, the method further comprises eliminating interference between received signals.

20. The method as defined in claim 18, wherein in the uplink direction the base transceiver station interprets the first and second signals using a signal processing method to eliminate interference between the first and second signals.

21. The method as defined in claim 18, wherein when interpreting both the downlink signal and the uplink signal a signal processing is used which eliminates interference between the signals.

22. The method as defined in claim 1, wherein the first and second signals are sent in a downlink direction from two transmitter antennas of the base transceiver station and received by one mobile station.

23. The method as defined in claim 22, wherein in an uplink direction to a base transceiver station, third and fourth signals are sent by different transmitter antennas on a same multiplexing channel, wherein the fourth signal is different from the third signal, the third and fourth signals thereby experiencing different radio channels, wherein the third and fourth signals are received at the base transceiver station by at least two antennas, wherein channel characteristics of the radio channels experienced by the third and fourth signals are estimated and wherein the third and fourth signals are interpreted at the base transceiver station with the aid of the estimated channel characteristics associated with the third and fourth signals and distinguishing signal characteristics resulting from the at least two antennas.

24. The method as defined in claim 23, wherein the third and fourth signals in the uplink direction are sent from two mobile stations independently of one another.

25. The method as defined in claim 23, wherein in the uplink direction information to be transmitted from a mobile station is divided into the third and fourth signals and the third and fourth signals are transmitted by at least two antennas of one mobile station.

26. The method as defined in claim 25, wherein the characteristics of the radio channels experienced by signals received at the base transceiver station in the uplink direction are estimated and transmission of signals addressed to the mobile station in the downlink direction is directed with aid of the radio channel characteristics estimated in the uplink direction.

27. A base transceiver station for a telecommunications system including at least mobile stations, base transceiver stations and their antenna units, and wherein data transmission resources are divided into multiplexing channels, by the use of which connections may be set up between the mobile stations and the base transceiver station, the base transceiver station comprising:

means for dividing information to be sent into at least two different signals;

means for sending the at least two different signals on a same multiplexing channel using at least two antennas, thereby causing the at least two different signals to experience different radio channels; and means for receiving on a multiplexing channel a sum signal comprising at least a first signal and a second signal different from the first signal, the first and second signal having been sent on the same multiplexing channel in an uplink direction from mobile stations using at least two antennas, thereby causing the at least first and second signals to experience different radio channels.

28. The base transceiver station as defined in claim 27, wherein the base transceiver station is adapted to divide information to be sent to at least two mobile stations into the at least two different signals.

29. The base transceiver station as defined in claim 27, wherein the base transceiver station is adapted to divide information to be sent to one mobile station into the at least two different signals.

30. The base transceiver station as defined in claim 27, further comprising:

means for estimating channel characteristics of radio channels experienced by said at least a first signal and a second signal received on a same multiplexing channel in an uplink direction from mobile stations; and means for detecting said at least first and second signals received on the same multiplexing channel from the sum signal by using the estimated channel characteristics.

31. The base transceiver station as defied in claim 30, further comprising means for directing transmission of signals addressed to mobile stations in a downlink direction with aid of radio channel characteristics estimated in the uplink direction.

32. A base transceiver station for a telecommunications system including at least mobile stations, base transceiver stations and their antenna units, and wherein data transmission resources are divided into multiplexing channels, by the use of which connections may be set up between the mobile stations and the base transceiver station, the base transceiver station comprising:

means for receiving on a multiplexing channel a sum signal comprising at least a first signal and a second signal different from the first signal, the first and second signal having been sent on the same multiplexing channel in an uplink direction from mobile stations using at least two antennas, thereby causing the at least first and second signals to experience different radio channels, means for estimating channel characteristics of radio channels experienced by said at least a first signal and a second signal received on the same multiplexing channel, and means for detecting said at least first and second signals received on the same multiplexing channel from the sum signal by using the estimated channel characteristics.

33. The base transceiver station as defined in claim 32, further comprising means for directing transmission of signals addressed to mobile stations in the downlink direction with aid of radio channel characteristics estimated in the uplink direction.

34. A mobile station for a telecommunications system including at least mobile stations, base transceiver stations and their antenna units, and wherein data transmission resources are divided into multiplexing channels, by the use of which connections may be set up between the mobile station and base transceiver stations, the mobile station comprising:

- means for receiving on a multiplexing channel a sum signal comprising at least a first signal and a second signal different from the first signal, the first and second signal having been sent on the same multiplexing channel using at least two antennas, thereby causing the at least first and second signals to experience different radio channels,
- means for estimating channel characteristics of radio channels experienced by said at least a first signal and a second signal received on the same multiplexing channel; and
- means for detecting said at least first and second signals received on the same multiplexing channel from the sum signal by using the estimated channel characteristics.

35. The mobile station as defined in claim 34, wherein the mobile station, in addition, is adapted to eliminate interference between the signals which it receives on the same multiplexing channel.

36. A mobile station for a telecommunications system including at least mobile stations, base transceiver stations and their antenna units, and wherein data transmission resources are divided into multiplexing channels, by the use of which connections may be set up between the mobile station and the base transceiver stations, the mobile station comprising:

- at least two antennas;
- means for dividing information to be sent into at least two different signals;
- means for sending the at least two different signals on a same transmitting multiplexing channel using the at least two antennas, thereby causing the at least two different signals to experience different radio channels; and
- means for receiving on a multiplexing channel a sum signal comprising at least a first signal and a second signal different from the first signal, the first and second signal having been sent on the same multiplexing channel using at least two antennas, thereby causing the at least first and second signals to experience different radio channels.

37. A mobile station as defined in claim 36, wherein the mobile station further comprises:

- means for estimating channel characteristics of radio channels experienced by said at least first signal and a second signal received on the same receiving multiplexing channel; and
- means for detecting said at least first and second signals received on the same receiving multiplexing channel from the sum signal by using the estimated channel characteristics.

38. The mobile station as defied in claim 37, wherein the mobile station is adapted to eliminate interference between signals received on the same receiving multiplexing channel.

\* \* \* \* \*